(12) United States Patent
Ackner et al.

(10) Patent No.: US 8,640,474 B2
(45) Date of Patent: Feb. 4, 2014

(54) SYSTEM AND METHOD FOR INCREASING THE EFFICIENCY OF A SOLAR HEATING SYSTEM

(76) Inventors: Richard Ackner, West Palm Beach, FL (US); Howard Burke, Cape Coral, FL (US)

( * ) Notice: Subject to any disclaimer, the term of this patent is extended or adjusted under 35 U.S.C. 154(b) by 0 days.

(21) Appl. No.: 13/341,974

(22) Filed: Dec. 31, 2011

(65) Prior Publication Data

US 2012/0131941 A1    May 31, 2012

(51) Int. Cl.
*F25B 27/00* (2006.01)
(52) U.S. Cl.
USPC .......................................... 62/235.1; 62/238.7
(58) Field of Classification Search
USPC .............. 62/235.1, 238.7; 165/48.2; 126/643; 1/235.1, 238.7
See application file for complete search history.

(56) References Cited

U.S. PATENT DOCUMENTS

| | | | | |
|---|---|---|---|---|
| 4,121,566 A | * | 10/1978 | Radenkovic | 126/585 |
| 4,438,881 A | * | 3/1984 | Pendergrass | 237/2 B |
| 2008/0092575 A1 | * | 4/2008 | Muscatell | 62/235.1 |
| 2009/0139515 A1 | * | 6/2009 | Gee et al. | 126/655 |
| 2011/0114081 A1 | * | 5/2011 | Lee | 126/643 |

OTHER PUBLICATIONS

Dictionary.com, Definition of "enclose", Entry No. 2., http://dictionary.reference.com/browse/enclose, accessed Jul. 13, 2013.*

* cited by examiner

*Primary Examiner* — Frantz Jules
*Assistant Examiner* — Cassey D. Bauer
(74) *Attorney, Agent, or Firm* — Gold & Rizvi, P.A.; Glenn E. Gold

(57) ABSTRACT

A solar collector assembly comprises a plurality of heater collection tubes. A thermal enhancement manifold assembly is integrated into the solar collector assembly to enhance thermal efficiency. The enhancement manifold assembly includes a supply manifold subassembly which selectively distributes a refrigerant between at least two supply manifolds and a return manifold subassembly which distributes the refrigerant between at least two return manifolds. A thermal enhancing tube provides fluid communication between each supply manifold and respective return manifold. The thermal enhancing tubes are assembled within an interior volume of the solar heater collection tubes. Each manifold pairing is operatively governed by a respective fluid control valve. The manifold pairings alternate between an active state and an inactive state, optimizing thermal transfer between the collection tube and a refrigerant. The refrigerant is retained within an inactive tube set of thermal enhancing tubes and flows therethrough in an active tube set.

16 Claims, 8 Drawing Sheets

SYSTEM AND METHOD FOR INCREASING THE EFFICIENCY OF A SOLAR HEATING SYSTEM

FIELD OF THE INVENTION

The present disclosure generally relates to solar heating systems. More specifically, the present disclosure relates to a system and method for improving the performance and efficacy of heat pump systems using evacuated tube solar collectors.

BACKGROUND OF THE INVENTION

Heat pump systems are well known for providing both heating and cooling by using a small amount of energy to move heat from one location to another. Heat pumps are typically used to pull heat out of the air or ground to heat a home or office building, but they can be reversed to cool a building as well. One of the biggest advantages of a heat pump over a standard heating ventilation and air conditioning (HVAC) unit is that there's no need to install separate systems to heat and cool your home. Heat pumps also work extremely efficiently, because they only transfer heat, rather than burn fuel to create it. This makes them more "green" than a gas burning furnace. In fact, they don't just heat and cool buildings. Anyone that has ever enjoyed a hot tub or heated swimming pool probably has a heat pump to thank.

While heat pump systems provide a host of benefits, there has been a long felt need to improve the efficiency and overall performance of such systems. In particular, it would be highly advantageous to accomplish this by providing an improved heat pump system incorporating an environmentally friendly (i.e., "green") subassembly capable of efficiently raising the temperature of the hot gas line of the heat pump system. For example, it would be a tremendous benefit to provide a means for integrating an existing solar thermal assistance technology, such as a solar collector subsystem, into an existing conventional heat pump system to provide the aforementioned improved performance.

Solar heating and cooling systems use the sun as a source for energy needs. Because the sun is a renewable energy source, it has the potential to supply a home with enough power to meet its energy requirements every day. Solar energy is accumulated through a solar collector, a system that converts sunlight to usable energy by capturing and retaining heat from the sun and transferring this heat to a liquid.

Evacuated glass tubes, one form of solar collectors, provides a way in which heat loss to the environment, inherent in flat plate collectors, has been reduced. Since heat loss due to convection cannot cross a vacuum, it forms an efficient isolation mechanism to keep heat inside collector pipes. While evacuated tube technology clearly surpasses flat panel collectors or batch solar collectors for nearly all water heating applications, the advantages are truly dramatic when used for solar air conditioning and heating. This is because evacuated tube heat pipe collectors can more easily attain the higher temperature needed, they can collect and retain heat even when it is very cold outside, and they collect solar energy more evenly throughout the day resulting in lower buffer or thermal storage requirement. Generally, an evacuated tube solar collector contains several rows of glass tubes connected to a header pipe. Each tube has the air removed from it (evacuated) to eliminate heat loss through convection and radiation. Inside the glass tube, a flat or curved aluminum or copper fin is attached to a metal pipe. The fin is covered with a selective coating that transfers heat to the fluid that is circulating through the pipe.

What is desired is such an evacuated tube solar thermal assisting subsystem that can be easily integrated with, or retrofitted into, a conventional heat pump system to efficiently and effectively provide added heat to the system to extend the functionality of the heat pump system and thereby reduce the requirement to utilize electric heat strip or other alternate systems. Preferably, the system should have the inherent flexibility to be installed with any new heat pump or, alternatively, retrofitted to an existing heat pump, to boost the performance of the heat pump to provide interior heating, as well as to be connected to provide a hot water boost and pool/spa heating. This would negate the need for a separate pool heat pump. The heat pump, when used in its reverse cycle for air conditioning should, when either water heating or pool heating is desired, be able to route the hot gas through the solar collector and heat exchanger, and then back to the condenser. Preferably, the system can be prioritized to heat water when the temperature drops below a specified point. In this manner, the system would both provide free hot water and improve the air conditioning performance as the heat exchanger functions as an additional condenser. This would be particularly effective during the air conditioning cycle, where gas would not be routed through the solar collector unless water heating or pool heating is desired. In this manner, the panels would have the maximum heat available to put very hot gas into the heat exchanger to heat the water rapidly.

SUMMARY OF THE INVENTION

The basic inventive concept provides a solar collector assembly configured for integration with a heat pump system for improving the efficacy of the heat pump system, the solar collector assembly comprising:
  a plurality of solar heater collection tubes;
  a fluid distribution manifold subassembly, comprising:
  a fluid supply inlet;
  a first fluid supply distribution conduit;
  a second fluid supply distribution conduit; and
  a fluid supply control valve fluidly interconnecting said fluid supply inlet with said first and second fluid supply distribution conduits to control the flow of said fluid from said fluid supply inlet to said first and second fluid supply distribution conduits;
  a fluid collection manifold subassembly, comprising:
  a fluid return outlet;
  a first fluid return collection conduit;
  a second fluid return collection conduit; and
  a fluid return control valve fluidly interconnecting fluid return outlet with said first and second fluid return collection conduits to control the flow of said fluid from said first and second fluid return collection conduits to said fluid return outlet; and,
  at least one first thermal transfer enhancing tube having a fluid inlet end for receiving a flow of fluid from said first fluid supply distribution conduit and a fluid outlet end for the egress of said flow of fluid from said first fluid supply distribution conduit into said first fluid return collection conduit; and
  at least one second thermal transfer enhancing tube having a fluid inlet end for receiving a flow of fluid from said second fluid supply distribution conduit and a fluid outlet end for the egress of said flow of fluid from said second fluid supply distribution conduit into said second fluid return collection conduit, wherein, one of the at least one first thermal transfer enhancing tubes and one of the at least one second thermal transfer enhancing tube is located within one of the plurality of solar heater collection tubes;

wherein, fluid flow through said solar collector assembly is controlled to alternate fluid flow through said first and second thermal transfer enhancing tubes such that stagnant fluid in said first thermal transfer enhancing tube is subjected to solar heating while fluid continues to flow through said second thermal transfer enhancing tube, and vice versa.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Dual evacuated U-tube solar collector assemblies are used to raise the temperature of hot gas line for a heat pump system, thus substantially improving the performance of a heat pump. Current collectors include one hot leg and one cold leg. The present invention modifies the existing system by introducing two hot legs as illustrated in FIGS. 1 through 5. The introduction of two hot legs improves the operational efficiency of the overall system. In practice, the inclusion of two hot legs can be the difference between the heat pump functioning and the electric heat strip running. The system will heat the operational fluid more quickly and efficiently, thus requiring less electrical energy than the currently available configuration. As an additional benefit of the increase in thermal transfer efficiency, the system would require less run time, thus further reducing consumption of electrical energy.

Figure 4:
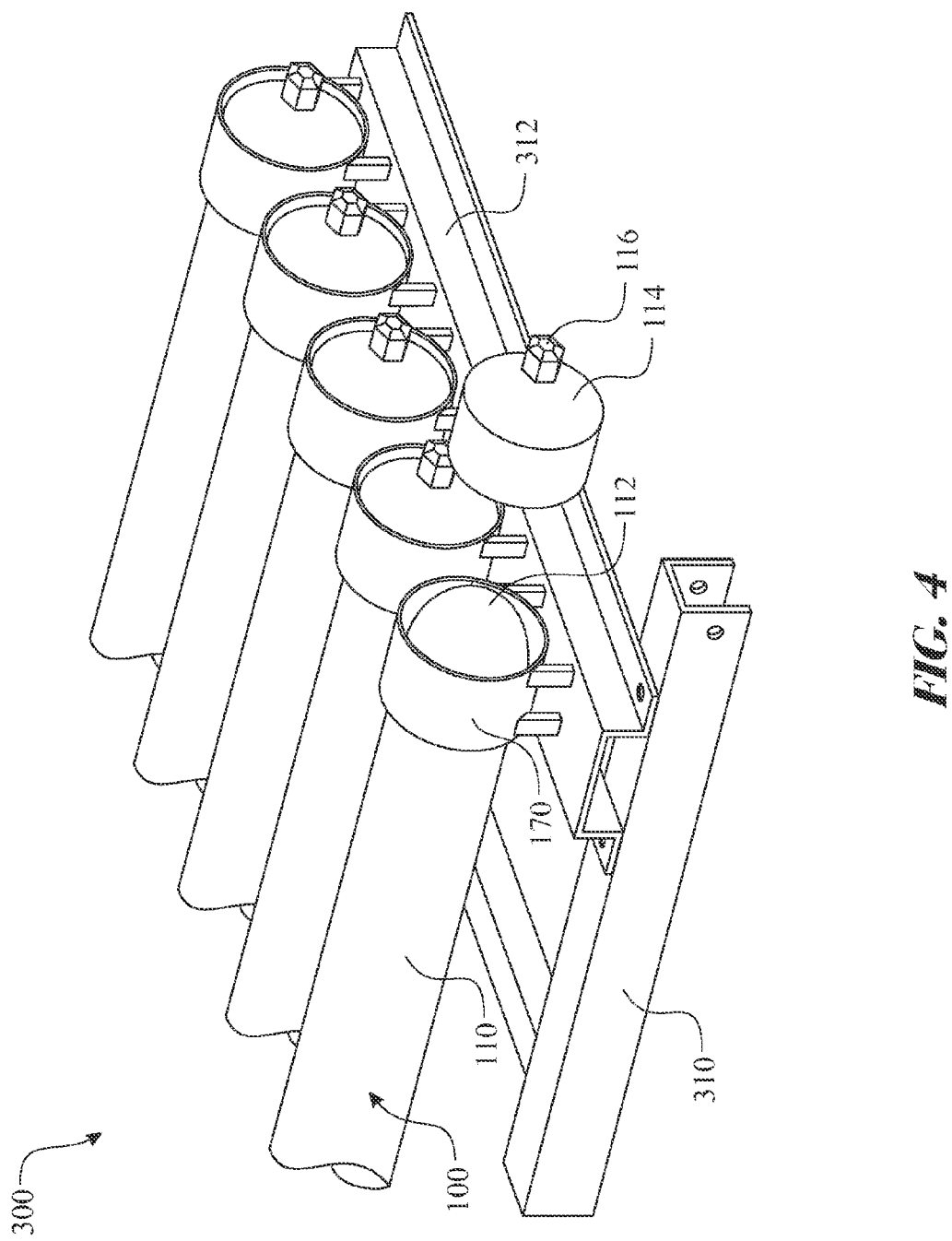
FIG. 4 presents an isometric view of a distal end of an exemplary solar heater assembly.
Figure 5:
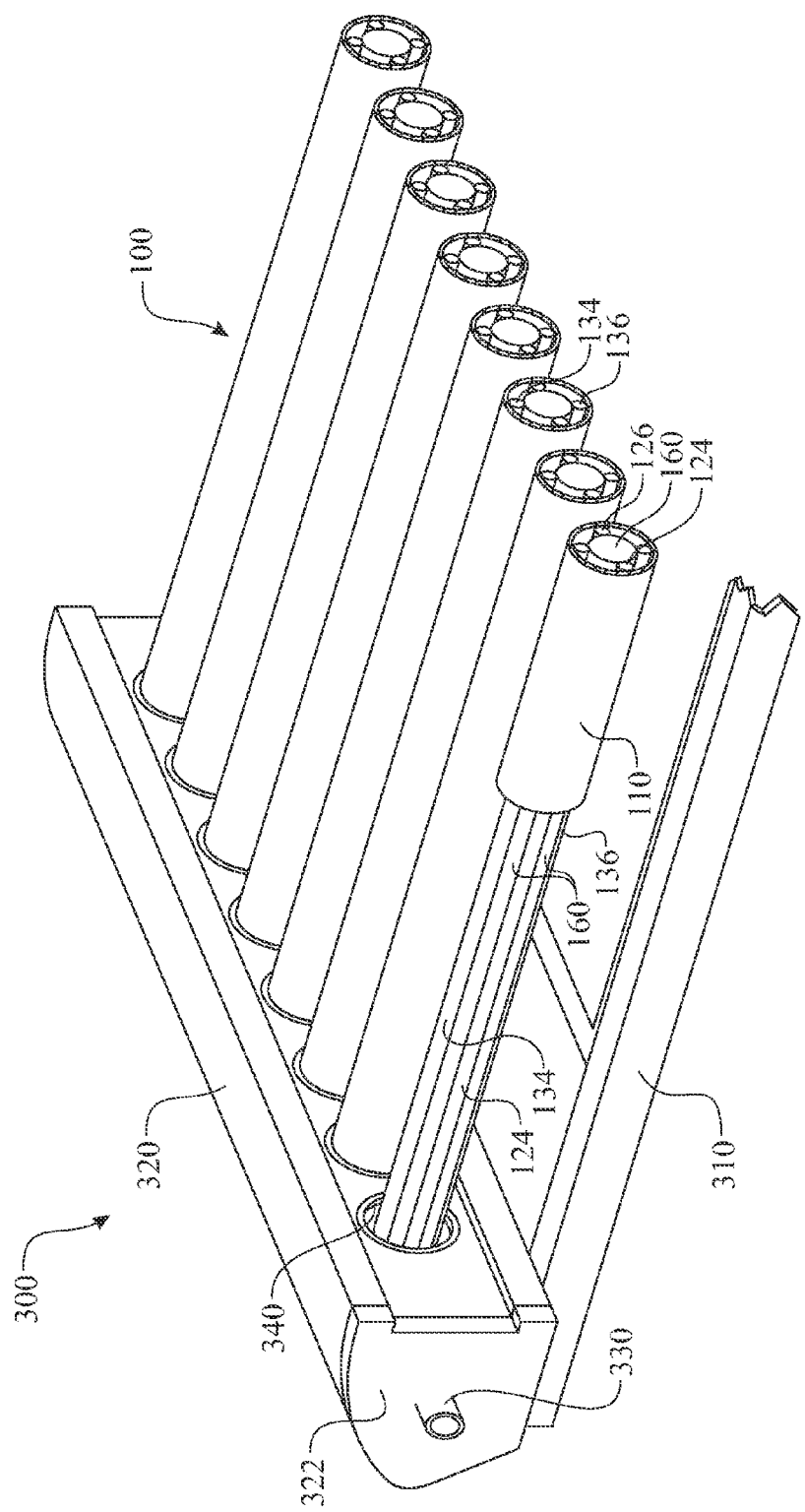
FIG. 5 presents an isometric view of a manifold end of the exemplary solar heater assembly introduced in FIG. 4.
Figure 6:
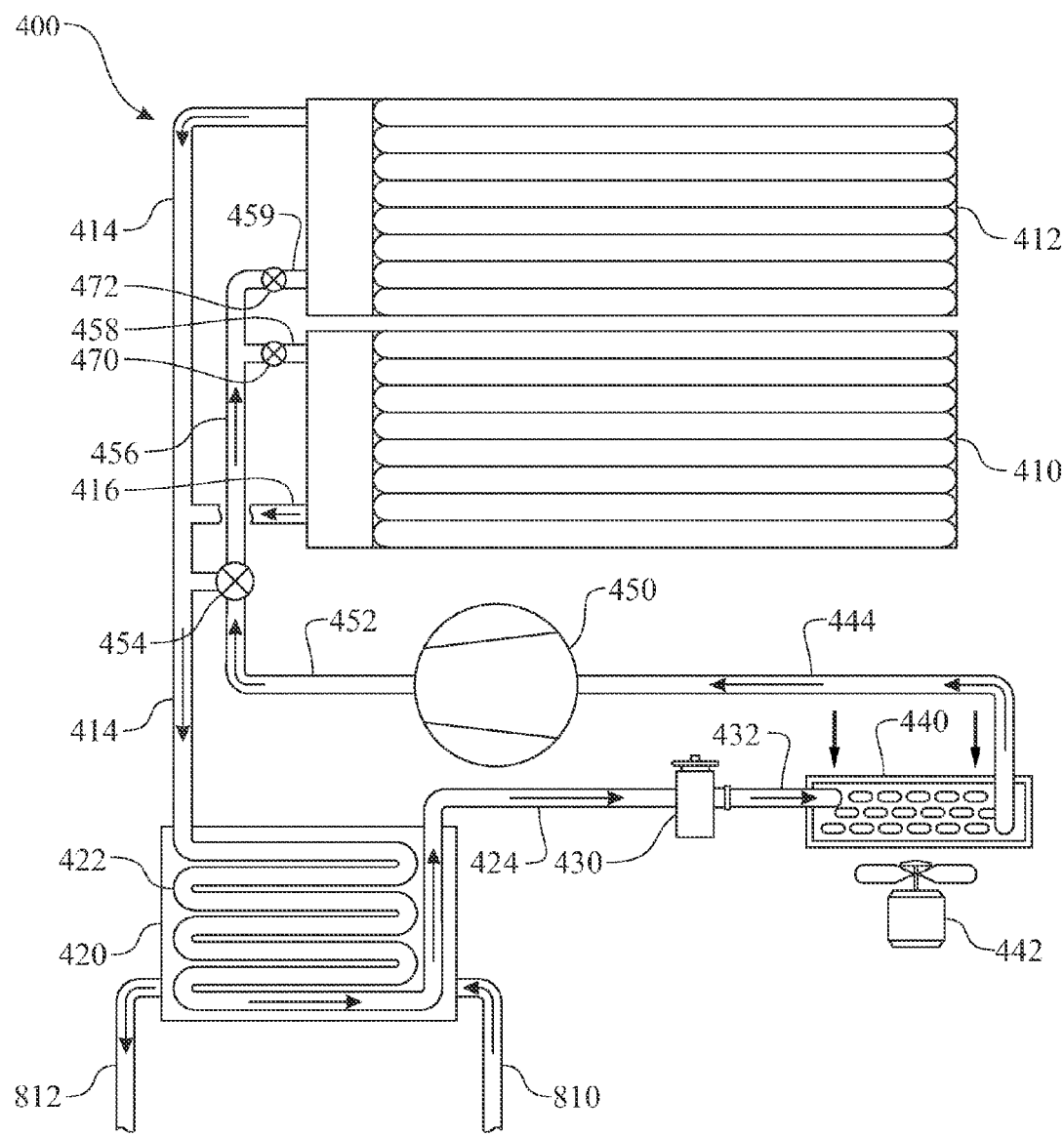
FIG. 6 presents a schematic diagram of an exemplary unidirectional solar assisted heat pump system.
Figure 8:
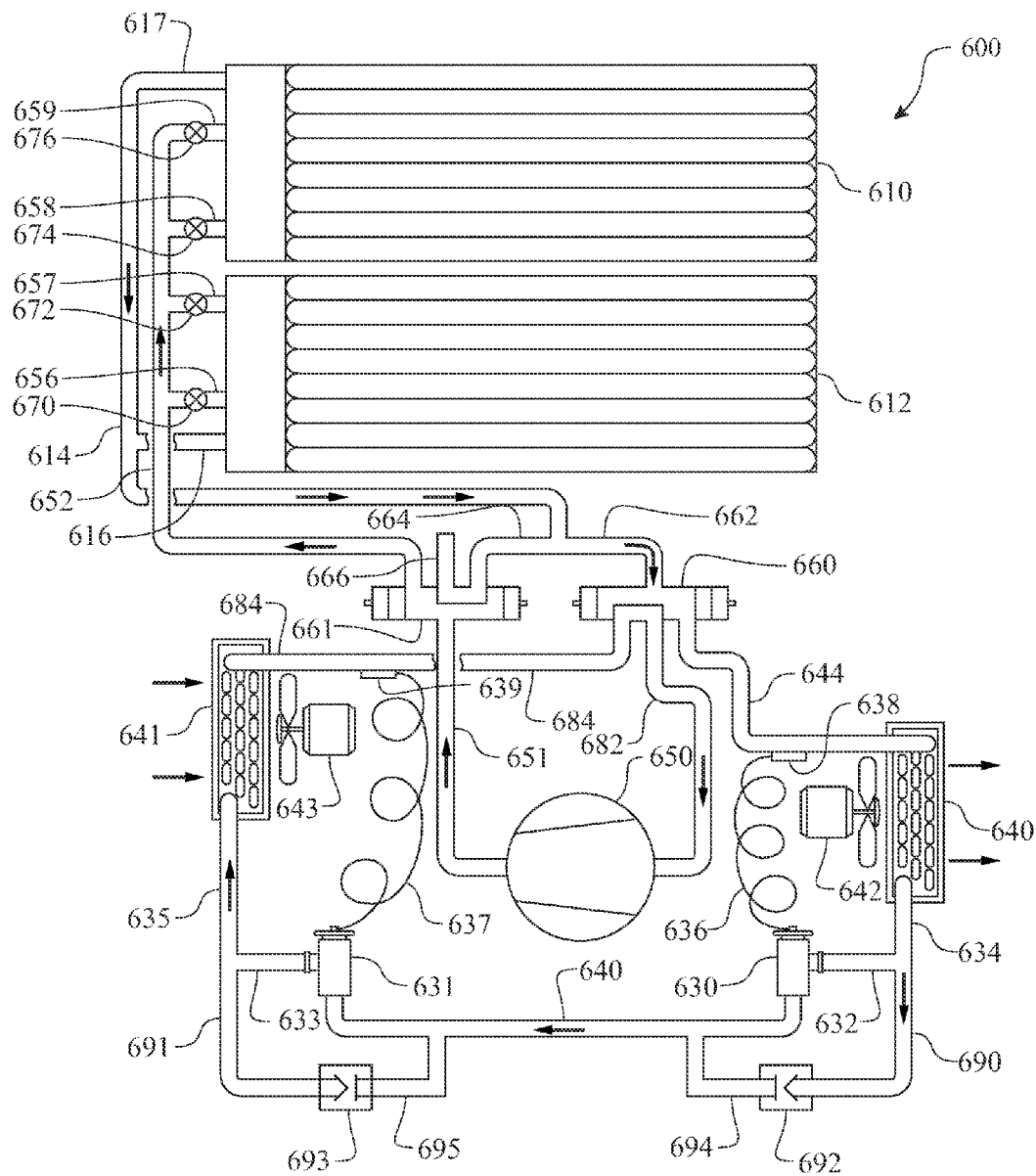
FIG. 8 presents a schematic diagram of a second exemplary reversible-cycle heat pump system comprising a pair of solar heater assemblies.
Figure 9:
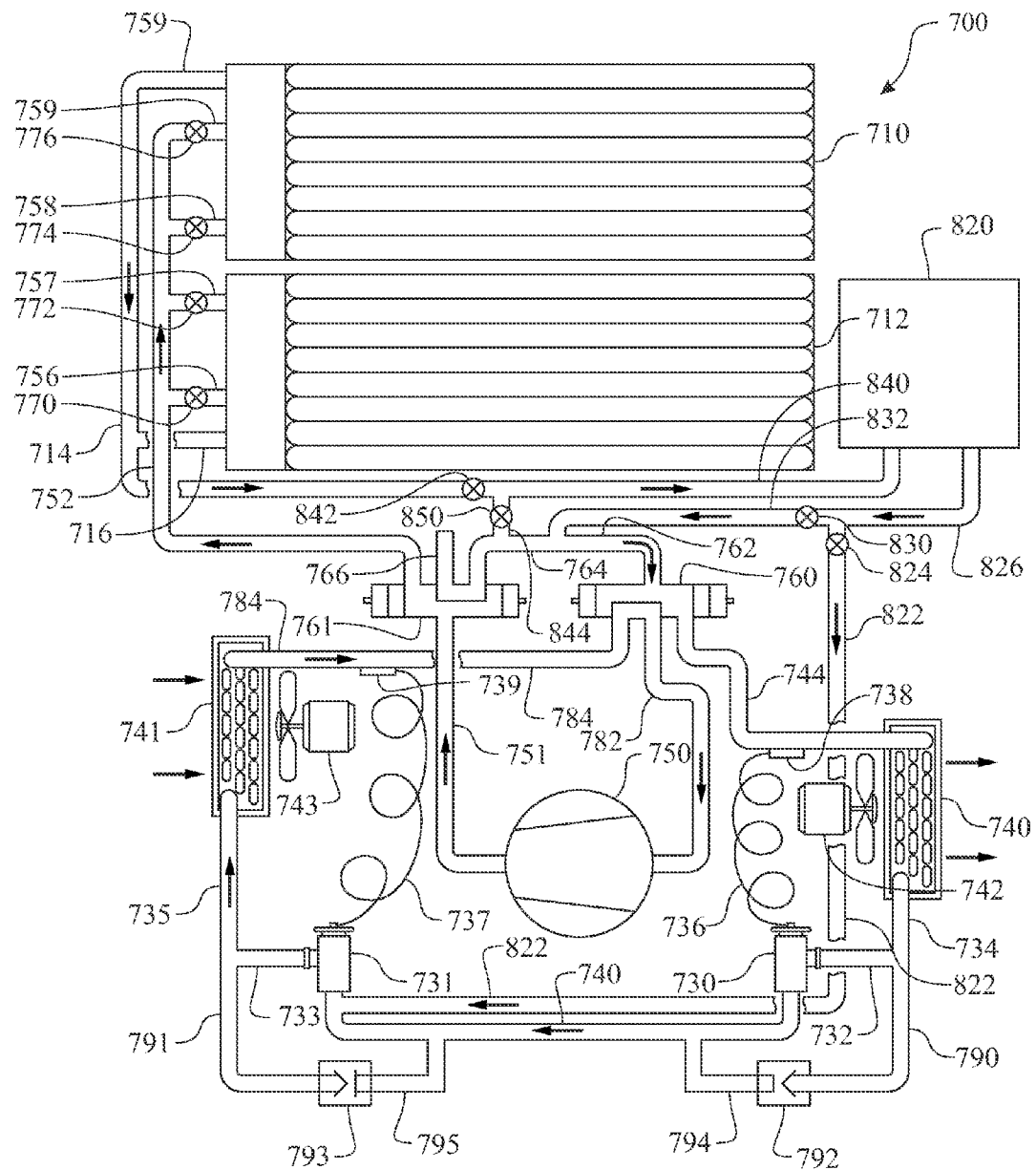
FIG. 9 presents a schematic diagram of the second exemplary reversible-cycle heat pump system of FIG. 8, further comprising a hot water heat exchanger.

An exemplary evacuated tube solar collector assembly 300 is illustrated in FIGS. 4 and 5. The evacuated tube solar collector assembly 300 is reasonably efficient, where sun orientation is not critical as the tubes passively track the changing direction of rays from the sun. At 9 AM, even on a cloudy day, the temperature inside the tube can exceed 300 degrees. Due to the vacuum insulation, the dual tube evacuated solar collector assembly 100 is not affected by outside temperature. Three hundred (300) degree plus temperatures in the tube can be produced in freezing conditions. The gas temperature coming from the heat pump is however affected by the outside temperature as the heat pump draws its heat from the outside ambient air. The lower the air temperature is, the lower the temperature of the gas leaving the compressor will be. Since the heat generated by the solar collector is unaffected by the outside ambient temperature, there will be plenty of heat to raise the temperature of the gas from a minimum of ten (10) degrees, up to forty (40) degrees or higher. This hotter gas will go right into the heat exchanger 540, 541 (FIG. 7) or evaporator 540, 541 (FIG. 7) providing instant benefits of heated water or air temperatures. When applied to air source heat pumps used to heat structures, this will eliminate "cold blow"; one problem associated with all heat pumps. Due to the speed that the hot gas travels through the solar collector, the heat is dissipated from the collector fairly rapidly. When the collector has approx twenty (20) minutes to gain heat, if the gas enters the collector at one hundred thirty (130) degrees Fahrenheit, it will leave the collector at approximately two hundred (200) degrees Fahrenheit. Over the course of a ten (10) minute period, the temperature will drop to approximately one hundred forty (140) degrees Fahrenheit. The heat drop occurs in a fairly linear progression, meaning that over the ten minute period, the heat gain average is approx. 35 degrees. If this is in a period of intense sun, from 10 AM to 2 PM, the heat gain will be higher. If one panel were to run for at least twenty (20) minutes, the heat gain after the first ten (10) minute period would be level out to be approximately five (5) degrees Fahrenheit. Once the flow to the evacuated tube solar collector assembly 300 is turned off for at least ten (10) minutes, the evacuated tube solar collector assembly 300 collects heat and will discharge the gas at a temperature of at least one hundred eighty (180) degrees Fahrenheit (based upon an initial supply temperature of one hundred thirty 130 degree Fahrenheit). Alternating the flow of the thermal transfer fluid between two evacuated tube solar collector assemblies 300, as illustrated in FIGS. 6, 8, and 9, increases the efficiency of the system.

The evacuated tube solar collector assembly 300 is fabricated including a support frame to support a series of dual tube evacuated solar collector assemblies 100 as illustrated in FIGS. 4 and 5. The support frame can be provided in any configuration; wherein the exemplary support frame includes multiple longitudinal heater frame members 310 and lateral heater frame members 312 assembled together using any common fabrication techniques. Each dual tube evacuated solar collector assembly 100 can be supported by any reasonable mechanical coupling. The illustration of FIG. 4 presents an exemplary solar heater collection tube anchor 170 assembled to a member of the frame. The solar heater collection tube 110 is inserted into the solar heater collection tube anchor 170 and secured in position. This configuration enables thermal expansion of the solar heater collection tube 110 within the evacuated tube solar collector assembly 300. A heat absorption tube end cap 114 can be utilized, providing access for servicing and a seal for operation. A vacuum port 116 can be integrated into the heat absorption tube end cap 114 enabling extraction of gas within an interior volume of the dual tube evacuated solar collector assembly 100, thus creating a vacuum.

Figure 1:
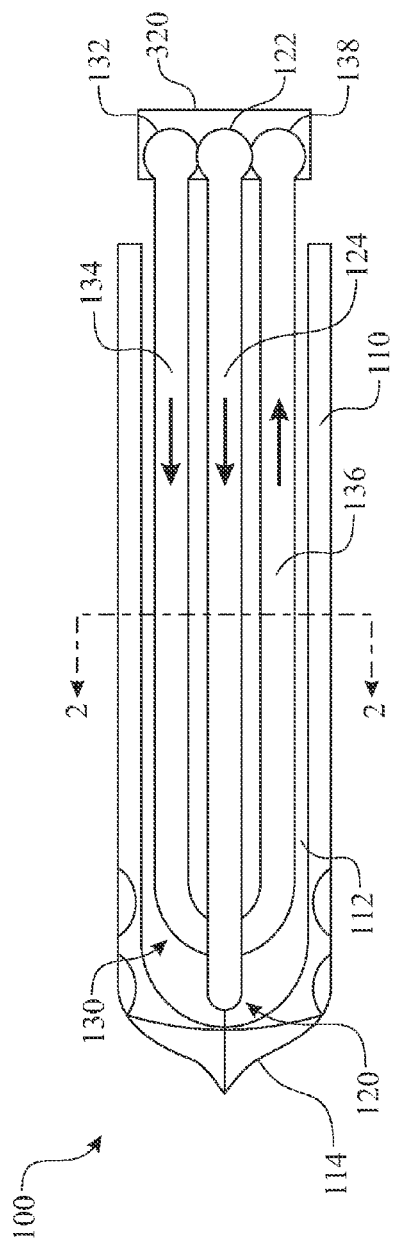
FIG. 1 presents a side sectioned view of an exemplary solar heater collection tube assembly comprising an exemplary pair of thermal transfer enhancing tubes.
Figure 2:
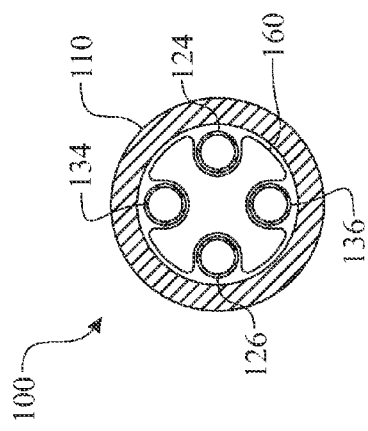
FIG. 2 presents a sectioned elevation view of the exemplary solar heater collection tube assembly, the section being taken along section line 2-2 of FIG. 1.

A thermal carrier fluid supply conduit 330 is integrated into an evacuated tube solar collector assembly 300, the thermal carrier fluid supply conduit 330 having a series of branches routed through a respective series of dual tube evacuated solar collector assemblies 100. The thermal carrier fluid supply conduit 330 is provided in fluid communication between a compressor 450 and a heat exchanger 420 and/or a reversing valve 560 as presented in the exemplary illustration presented in FIGS. 6 and 7, respectively. Each pair of thermal enhancing tubes 140, comprising the thermal transfer enhancing tubes 120, 130 are integrated into each dual tube evacuated solar collector assembly 100, as illustrated in FIGS. 1, 2, and 5. The fluid distribution manifold subassembly 202 and fluid collection manifold subassembly 204 are preferably integrated into a solar heater manifold cover 320 of the evacuated tube solar collector assembly 300. Access would be provided by a removable solar heater manifold end cap 322. Each of the solar heater collection tubes 110 passes through a collection tube port 340 provided through the solar heater manifold cover 320.

The inclusion of a thermal enhancing material introduces efficiency advantages to the dual tube evacuated solar collector assembly 100. An example of an acceptable thermal enhancing material would be a refrigerant, such as Freon. The inclusion of a refrigerant introduces several obstacles in the current configuration. The first obstacle is the pressure. Current dual tube evacuated solar collector assemblies 100 are designed to contain pressurized fluids or gasses up to approximately 150 pound-force per square inch (PSIG). A first thermal transfer enhancing tube 120 and second thermal transfer enhancing tube 130 are integrated into each dual tube evacuated solar collector assembly 100, where the thermal transfer enhancing tubes 120, 130 are fabricated of an optimal material, such as copper. Pure copper is capable of withstanding the elevated pressures (such as 400-600 PSIG required to support refrigerants such as Freon) and has a high thermal conductivity rate (where k=204-223 BTU/(hr F ft) depending upon the operational temperature). Most other metals have thermal conductivity rates which are significantly lower, such as aluminum (having a thermal conductivity rate k=118-144 BTU/(hr F ft)), Beryllium (having a thermal conductivity rate k=126 BTU/(hr F ft) at 68 F), Gold (having a thermal conductivity rate k=182 BTU/(hr F ft) at 68 F), Zirconium (having a thermal conductivity rate k=145 BTU/(hr F ft) at 68 F), and the like. When considering other incidentals, such as materials and manufacturing costs, health, long-term reliability, corrosion, and the like, copper is optimal.

Figure 3:
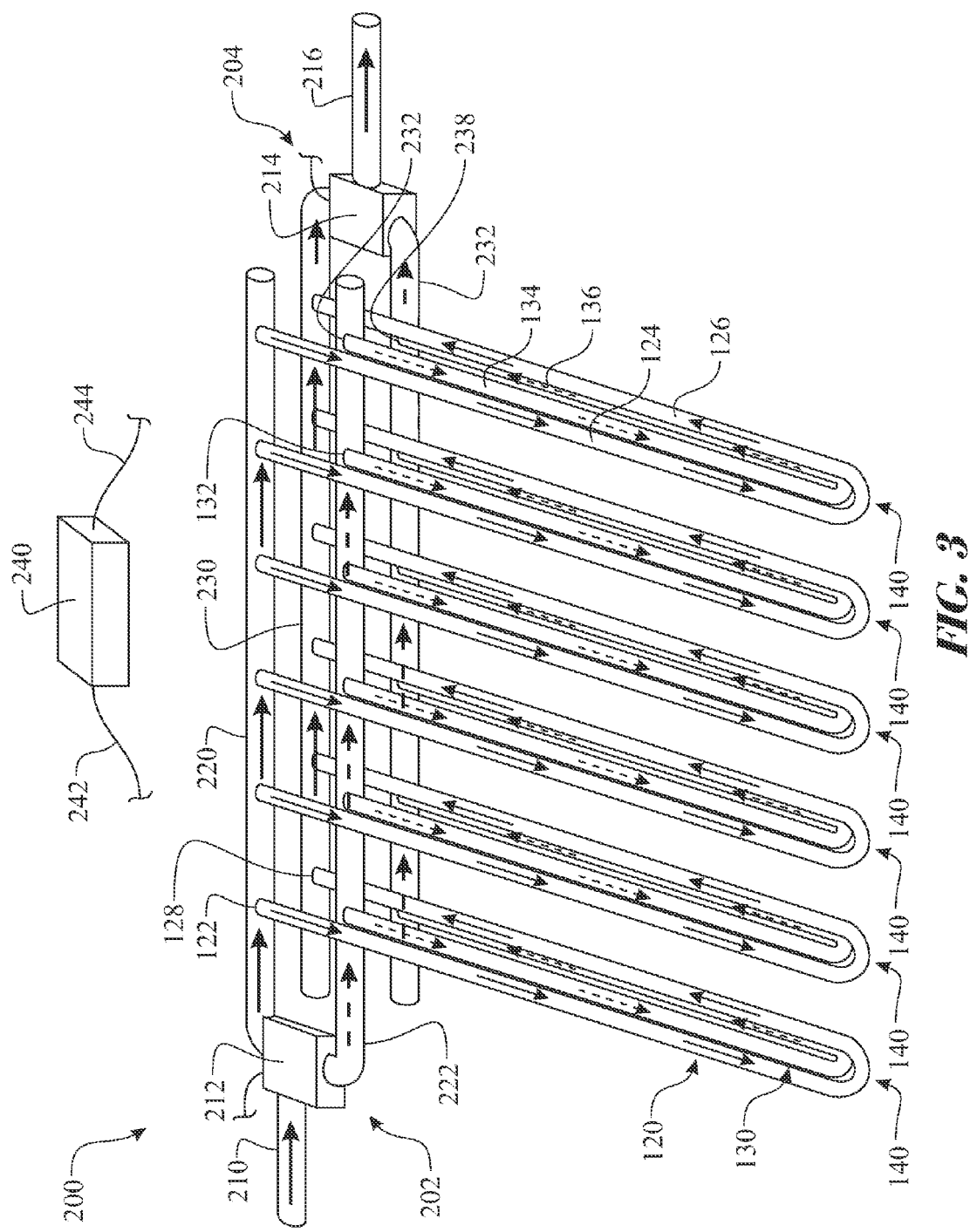
FIG. 3 presents an isometric view of an exemplary solar heater thermal enhancement manifold assembly providing operational Freon flow through the pair of thermal transfer enhancing tubes.

The invention has uniquely designed solar collectors with two sets of U tubing in each evacuated tube, allowing the inactive tube to recharge its heat. An exemplary solar heater thermal enhancement manifold assembly 200 is illustrated in FIG. 3. The solar heater thermal enhancement manifold assembly 200 optimizes the utilisation of a refrigerant to aid in transferring thermal energy obtained from the sun to a fluid passing through the dual tube evacuated solar collector assembly 100. The solar heater thermal enhancement manifold assembly 200 includes a fluid distribution manifold subassembly 202 and a fluid collection manifold subassembly 204. A manifold fluid supply inlet and conduit 210 introduces the refrigerant into the fluid distribution manifold subassembly 202. The manifold fluid supply inlet and conduit 210 is in fluid communication with a first fluid supply distribution conduit 220 and a second fluid supply distribution conduit 222. Flow between the manifold fluid supply inlet and conduit 210 and the first fluid supply distribution conduit 220 or second fluid supply distribution conduit 222 is governed by a fluid supply control valve 212. The fluid supply control valve 212 directs flow to one of the first fluid supply distribution conduit 220 or second fluid supply distribution conduit 222, while sealing the refrigerant within the other supply manifold 220, 222. Similarly, a manifold return conduit 216 collects the refrigerant from the fluid collection manifold subassembly 204. The manifold return conduit 216 is in fluid communication with a first fluid return collection conduit 230 and a second fluid return collection conduit 232. Flow between the first fluid return collection conduit 230 or second fluid return collection conduit 232 and the manifold return conduit 216 is governed by a fluid return control valve 214. The fluid return control valve 214 directs flow from one of the first fluid return collection conduit 230 or second fluid return collection conduit 232, while sealing the refrigerant within the other return manifold 230, 232.

Operation of the fluid supply control valve 212 is provided by a manifold control unit 240. The manifold control unit 240 includes a microprocessor, an instruction set for directing operation by the microprocessor, a signal controller, at least one relay, and any other elements required to support the subject application. A supply control valve signal interface 242 provides signal communication between the manifold control unit 240 and the fluid supply control valve 212. Similarly, a return control valve signal interface 244 provides signal communication between the manifold control unit 240 and the fluid return control valve 214. The manifold control unit 240 can be directed to operate based upon time, thermal cycles, tube temperature readings, refrigerant temperature readings, ambient temperature readings, and the like.

The solar heater thermal enhancement manifold assembly 200 is incorporated within the evacuated tube solar collector assembly 300 to optimize thermal transfer. Each pair of thermal enhancing tubes 140 are assembled within an evacuated thermal transfer volume 112 the respective dual tube evacuated solar collector assembly 100. Each pair of thermal enhancing tubes 140 comprises a first thermal transfer enhancing tube 120 and a second thermal transfer enhancing tube 130. Each evacuated tube has an aluminum fin 160 inside, which makes contact with, or is very close to, the surface of the tube. The fin is dimpled to accept the copper U tube providing heat transfer from the inner surface of the evacuated tube to the gas inside the copper U tube.

A series of first thermal transfer enhancing tube 120 are provided in fluid communication between the first fluid supply distribution conduit 220 and the first fluid return collection conduit 230. In the exemplary embodiment, the first thermal transfer enhancing tube 120 can be fabricated in a "U-shaped" configuration, where each first thermal transfer enhancing tube 120 comprises a first thermal enhancing tube supply segment 124 and a first thermal enhancing tube return segment 126 having a "U-shaped" transition formed therebetween. In a second embodiment, the first thermal transfer enhancing tube 120 can be fabricated in a linear configuration, locating the fluid distribution manifold subassembly 202 at a first end of the dual tube evacuated solar collector assembly 100 and the fluid collection manifold subassembly 204 at the opposite end of the dual tube evacuated solar collector assembly 100. A first thermal enhancing tube fluid inlet end 122 provides a fluid passageway for transferring the refrigerant from the first fluid supply distribution conduit 220 to the first thermal transfer enhancing tube 120. A first thermal enhancing tube return transition 128 provides a fluid passageway for transferring the refrigerant from the first thermal transfer enhancing tube 120 to the second fluid supply distribution conduit 222.

Similarly, a series of second thermal transfer enhancing tube 130 are provided in fluid communication between the second fluid supply distribution conduit 222 and the second fluid return collection conduit 232. In the exemplary embodiment, the second thermal transfer enhancing tube 130 can be fabricated in a "U-shaped" configuration, where each second thermal transfer enhancing tube 130 comprises a second thermal enhancing tube supply segment 134 and a second thermal enhancing tube return segment 136 having a "U-shaped" transition formed therebetween. In a second embodiment, the second thermal transfer enhancing tube 130 can be fabricated in a linear configuration, locating the fluid distribution manifold subassembly 202 at a first end of the dual tube evacuated solar collector assembly 100 and the fluid collection manifold subassembly 204 at the opposite end of the dual tube evacuated solar collector assembly 100. A second thermal enhancing tube supply transition 132 provides a fluid passageway for transferring the refrigerant from the first fluid return collection conduit 230 to the second thermal transfer enhancing tube 130. A second thermal enhancing tube return transition 138 provides a fluid passageway for transferring the refrigerant from the second thermal transfer enhancing tube 130 to the second fluid return collection conduit 232.

In one instance, a refrigerant is introduced into the dual tube evacuated solar collector assembly 100. As the refrigerant passes through the dual tube evacuated solar collector assembly 100, the solar heater collection tube 110 transfers heat to the fluid and surrounding environment, thus aiding in the thermal transfer process. As the refrigerant passes through the dual tube evacuated solar collector assembly 100, the thermal energy retained by the solar heater collection tube 110 is transferred to the fluid and surrounding environment. The solar heater collection tube 110 optimizes the thermal transfer process by alternating between active and inactive first thermal transfer enhancing tubes 120, 130 allowing the inactive tubes to recharge, absorbing heat. The refrigerant absorbs the heat from the active tubes as the refrigerant passes through. When the heat is thoroughly absorbed from the active first thermal transfer enhancing tube 120, 130, the system alternates, exchanging the function between the tubes, making the active inactive and vice versa. This process optimizes the thermal efficiency of the refrigerant, and thus the efficiency of the overall system.

In practice, the system determines which of the thermal transfer enhancing tubes 120, 130 are to retain the volume of refrigerant and which are going to be cycled. The system operates the fluid supply control valve 212 and fluid return control valve 214, configuring the valves 212, 214 into the appropriate configuration. In the exemplary illustration presented in FIG. 3, solid lined arrows represent a first flow configuration and broken lined arrows represent a second flow configuration. The inactive or sealed portion of the solar heater thermal enhancement manifold assembly 200 (non-flowing portion of each respective configuration) enables the solar heater collection tube 110 to collect thermal energy. Refrigerant flows through the active or opened tubes collecting heat from the thermally saturated solar heater collection tube 110. The cycle repeats as deemed necessary. This would be referred to as a serial process. The same can be complete in a parallel process, where the system would pulse, cycling each of the first thermal transfer enhancing tube 120 and the second thermal transfer enhancing tube 130 between an active state and an inactive state in parallel.

The solar heater thermal enhancement manifold assembly 200 can be integrated into any evacuated tube solar collector assembly 300 and adapted for a variety of heat pump applications. In a first example, a pool heat pump, the pool water will reach the desired temperature quicker. Some advantages include a heat pump that will run less, saving energy while providing the user with better quality heat. A pair of solar heater assemblies 410, 412 are integrated into a heat pump system. Any suitable heat-transfer medium can be utilised as a thermal transporting medium. This can include water, often ethylene glycol, diethylene glycol, or propylene glycol, Betaine, Polyalkylene Glycol or PAG's, and the like. The present invention is directed towards an application utilising refrigerant. The heat-transfer medium is conveyed throughout the solar assisted heat pump system 400 by a series of conduits. The flow is controlled by a series of valves integrated into the solar assisted heat pump system 400.

The defrost cycle temperature point can be lowered to approx 20 degrees F. The additional heat generated by the solar collectors will still enable efficient use of the heat pump.

The heat-transfer medium flows through the solar heater assemblies 410, 412 to collect thermal energy. Each of the solar heater assemblies 410, 412 includes a solar heater thermal enhancement manifold assembly 200. The thermally charged heat-transfer medium is collected from the solar heater assemblies 410, 412 and transported to a pool water heat exchanger 420 directly by a thermally elevated fluid conduit 414 or indirectly through a thermally elevated fluid conduit 416 into the thermally elevated fluid conduit 414. The thermal energy is transferred to pool water through the pool water heat exchanger 420. The thermally charged heat-transfer medium passes through a heat exchanger conduit 422. Similarly, pool water is supplied to the pool water heat exchanger 420 by a pool water supply conduit 810, transferred through the pool water heat exchanger 420 in a manner that thermally couples the thermally charged heat-transfer medium and the pool water, and is returned to the pool via a pool water return conduit 812. The thermal energy stored within the thermally charged heat-transfer medium is transferred to the pool water by the thermal coupling. The thermal coupling can be physical contact or a conductive thermal transfer process, such as metal; a proximate relation or a convective thermal transfer process, such as forced airflow through a radiator, and the like, or any combination thereof. The thermally spend heat-transfer medium exits the pool water heat exchanger 420 through a system return conduit 424 and continues into an expansion valve 430. The expansion valve 430 (or generically referred to as a metering device) retains the pressure of the heat-transfer medium as the heat-transfer medium flows into a heat exchanger 440 via an expansion valve to heat exchanger conduit 432. Heat is absorbed by the heat-transfer medium as the heat-transfer medium passes through the heat exchanger 440. A fan 442 passes air across the heat exchanger 440 to enhance the heat transfer process to the heat-transfer medium, as the heat-transfer medium passes therethrough. A heat exchanger to compressor conduit 444 conveys the heat-transfer medium from the heat exchanger 440 to the compressor 450. The heat-transfer medium enters the compressor 450 in a low pressure, low temperature and generally gaseous state. The compressor 450 compresses the heat-transfer medium, which elevates the pressure and temperature of the heat-transfer medium.

The solar heater assemblies 410, 412 act as an additional heat source, which supplements the heat generated by the compressor 450. Flow of the heat-transfer medium into the solar heater assemblies 410, 412 can be governed by a bypass valve 454. The bypass valve 454 can enable flow of the heat-transfer medium from the compressor 450 through a compressor to solar heater supply conduit 452 and into a solar heater fluid supply manifold 456 for dispersion into the solar heater assemblies 410, 412 or the bypass valve 454 can divert the heat-transfer medium directly to the thermally elevated fluid conduit 414, thus bypassing the solar heater assemblies 410, 412.

A series of solar heater fluid supply control valves 470, 472 can be integrated into the solar assisted heat pump system 400, enabling the operator or system to selectively feed the heat-transfer medium to any or all of the solar heater assemblies 410, 412. In the exemplary illustration, the first solar heater fluid supply control valve 470 can govern flow between the solar heater fluid supply manifold 456 and the first solar heater assembly 410 via a first solar heater fluid supply conduit 458. Similarly, the second solar heater fluid supply control valve 472 can govern flow between the solar heater fluid supply manifold 456 and the second solar heater assembly 412 via a second solar heater fluid supply conduit 459. The series of solar heater fluid supply control valves 470, 472 enable the system to alternate between solar heater assemblies 410, 412 to increase the overall efficiency thereof.

Control sequence to provide a minimum of fifteen (15) degree Fahrenheit temperature rise in the hot gas vapor-one hour cycle. This is for a heat pump or pool heat pump. The times are adjustable through the microprocessor controller. The collectors are opened and closed with solenoid valves 470, 472.

a. In heat mode, the compressor 450 sends gas through the factory reversing valve (not shown). If the photoelectric sensor indicates sufficient light, the Solar Panel Reversing Valve (SPRV) (referred to as a bypass valve 454) opens tube set and the gas is routed through the solar heater assemblies 410, 412 and back into the inside unit. If there is insufficient light, the unit will operate in standard heating cycle.

b. The photo sensor (not shown) also activates a relay to instruct a defrost cycle not to run unless a pressure rise inside the outside unit indicates ice is blocking the airflow across the coils.

c. After seven (7) minutes tube set 1 (first thermal transfer enhancing tube 120 of FIG. 3) on the first solar heater assembly 410 closes and tube set 1 on the second solar heater assembly 412 opens.

d. After seven (7) minutes, the tube set 1 on second solar heater assembly 412 closes and tube set 2 on the first solar heater assembly 410 opens.

e. After seven (7) minutes, tube set 2 on the first solar heater assembly 410 closes and tube set 2 on the second solar heater assembly 412 opens.

f. After seven (7) minutes, tube set 2 on the second solar heater assembly 412 closes and the cycle repeats.

g. When the unit cycles off, the timer is reset and the cycle begins again.

h. If the photo sensor senses insufficient light, the SPRV 454 will close and the heat pump will operate without solar assist and the defrost cycle will reset to the factory settings.

Figure 7:
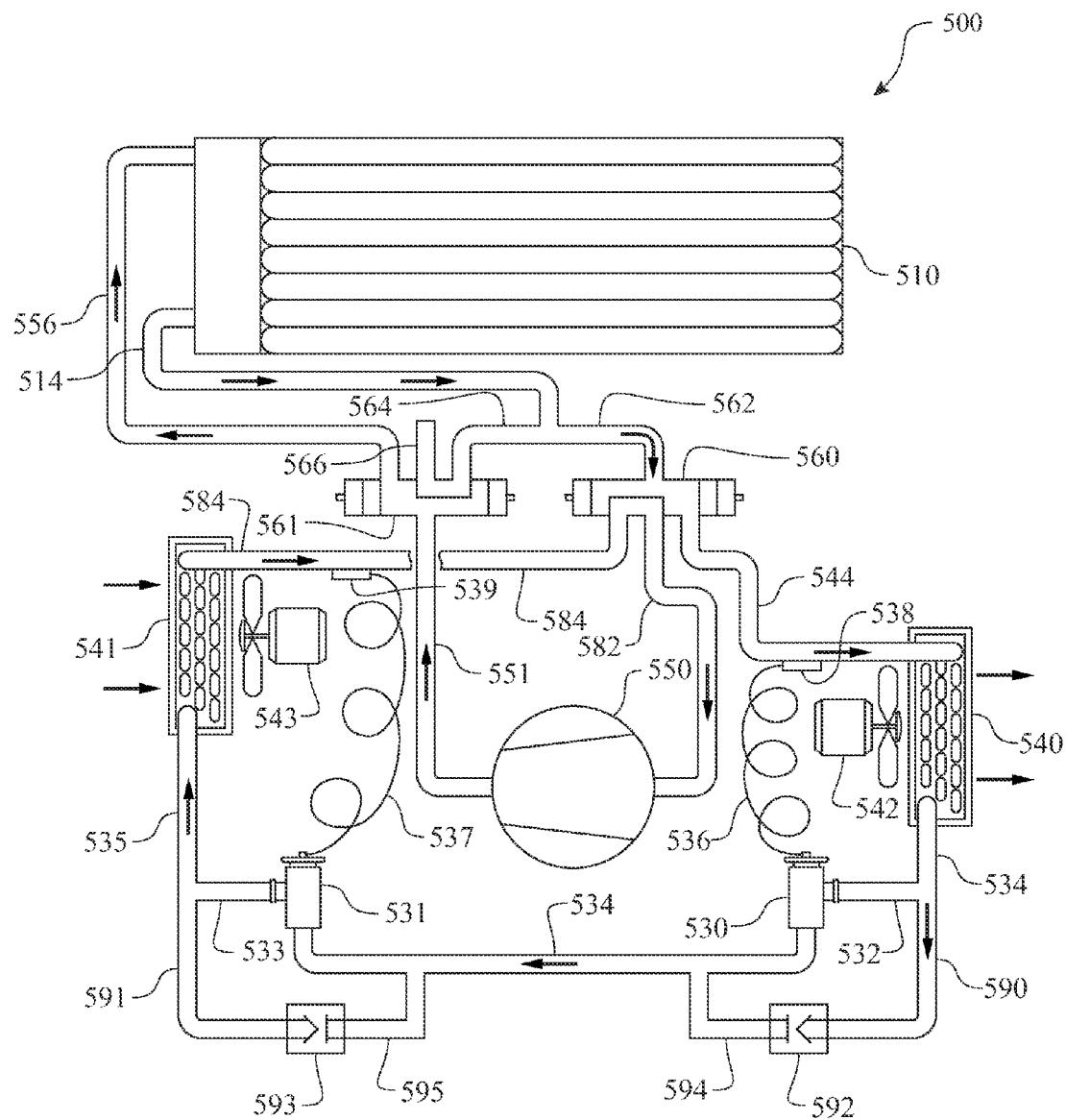
FIG. 7 presents a schematic diagram of an exemplary reversible-cycle heat pump system comprising a single solar heater assembly.

A reversible-cycle heat pump system 500 integrates the concepts presented in the solar assisted heat pump system 400 into a reversible-cycle heat pump configuration, as presented in the exemplary schematic diagram illustrated in FIG. 7. Reversible-cycle heat pumps are often seen in providing building-space heating in high latitude climates that are much warmer than comfortable in one season, but colder in another season. In heating, ventilation, and air conditioning (HVAC) applications, the term heat pump normally refers to a vapor-compression refrigeration system that includes a reversing valve 560, 561 and optimized heat exchangers 540, 541 so that the direction of thermal energy flow may be changed without loss of efficiency.

The reversible-cycle heat pump system 500 is presented in the schematic diagram illustrated in FIG. 7; the reversible-cycle heat pump system 500 comprising a portion of the components of the solar assisted heat pump system 400. Like features of reversible-cycle heat pump system 500 and solar assisted heat pump system 400 are numbered the same except preceded by the numeral '5'. Similar to the solar assisted heat pump system 400, the solar assisted heat pump system 400 includes the solar heater thermal enhancement manifold assembly 200 integrated within the solar heater assembly 510.

The reversible-cycle heat pump system 500 includes a pair of reversing valves 560, 561 which configure the system into either a heating configuration or a cooling configuration. The exemplary illustration presents a series of arrows that represent flow of the heat-transfer medium during an interior heating process. The process initiates at a compressor 550, which compresses the heat-transfer medium. The heat-transfer medium enters the compressor 550 in a low pressure, low temperature and generally gaseous state. The compressor 550 compresses the heat-transfer medium, which elevates the pressure and temperature of the heat-transfer medium.

The pressurized and heat latent heat-transfer medium flows through a compressor to solar reversing valve conduit 551 to the solar reversing valve 561. The solar reversing valve 561 can be configured to forward the heat-transfer medium from the compressor to solar reversing valve conduit 551 into either a solar heater fluid supply manifold 556 or an elevated fluid to solar reversing valve conduit 564, to either utilize or bypass the solar heater assembly 510. In the exemplary illustration, the solar reversing valve 561 is configured to route the heat-transfer medium into the solar heater fluid supply manifold 556, forwarding the heat-transfer medium to a solar heater assembly 510. The heat-transfer medium undergoes further heating as it passes through the solar heater assembly 510. The solar heater thermal enhancement manifold assembly 200 enhances the thermal energy collection of the heat-transfer medium within the solar heater assembly 510. A thermally elevated fluid conduit 514 transfers the thermally charged heat-transfer medium to a transition between an elevated fluid to factory reversing valve conduit 562 and an elevated fluid to solar reversing valve conduit 564. The direction of flow at the transition is governed by the configuration of the reversing valves 560, 561. In the exemplary embodiment, the factory reversing valve 560 is configured to route the thermally charged heat-transfer medium to an indoor heat exchanger 540 via a heat exchanger to compressor conduit 544.

The thermally charged heat-transfer medium passes through the indoor heat exchanger 540. An indoor fan 542 passes airflow across the indoor heat exchanger 540, extracting the thermal energy (in the form of heat) from the thermally charged heat-transfer medium, actively heating the surrounding environment using a forced or convective heat transfer process. The heat can be transferred to the air within the enclosed environment, water in a hot water heater, water in a pool, and the like. In the exemplary heating process, the process extracts thermal energy from the thermally charged heat-transfer medium. The indoor heat exchanger 540 provides the functionality of a condenser, which cools the heat-transfer medium. The heat-transfer medium can additionally change state from a vapor to a liquid. The spent heat-transfer medium is discharged from the indoor heat exchanger 540, flowing to either an expansion valve 530 or an indoor heating check valve 592 via an expansion valve supply conduit 534.

The expansion valve supply conduit 534 conveys the heat-transfer medium to a transition between a heat exchanger to expansion valve conduit 532 and an indoor heat exchanger to check valve conduit 590. The direction of flow is governed by an indoor heating check valve 592 and the condition of the expansion valve 530. The expansion valve 530 is operated by a thermally operated switch 538 coupled to the heat exchanger to compressor conduit 544 by an expansion valve control interface 536. The indoor heating check valve 592 regulates the flow of the heat-transfer medium to single direction. The thermally operated switch 538 monitors the temperature of the heat-transfer medium either directly with a sensor located through the heat exchanger to compressor conduit 544 or indirectly by measuring the temperature of the heat exchanger to compressor conduit 544. In the illustrated configuration, the heat-transfer medium passes through the indoor heating check valve 592, and expansion valve 530 is closed.

The unchanged heat-transfer medium is forwarded to the second expansion valve 531 (commonly referred to as a throttle valve) through an indoor heating check valve return conduit 594 and an expansion valve supply conduit 534. The second expansion valve 531 is operated by a thermally operated switch 539 coupled to the outdoor heat exchanger to factory reversing valve conduit 584 by a second expansion valve control interface 537. In the exemplary illustration, an outdoor heating check valve 593 directs flow of the heat-transfer medium through the second expansion valve 531 and the second expansion valve 531 is provided in an active state by the thermally operated switch 539. The thermally operated switch 539 monitors the temperature of the heat-transfer medium either directly with a sensor located through the outdoor heat exchanger to factory reversing valve conduit 584 or indirectly by measuring the temperature of the outdoor heat exchanger to factory reversing valve conduit 584. The second expansion valve 531 abruptly decreases the pressure of the modified heat-transfer medium, causing flash evaporation, which changes the state of the heat-transfer medium from a liquid to a vapor or a combination of a liquid and vapor.

In the reverse configuration, the flow of the heat-transfer medium bypasses the second expansion valve 531, flowing through a check valve to outdoor heat exchanger conduit 591, passing through the outdoor heating check valve 593, and returning the system through an outdoor heating check valve return conduit 595. The heat-transfer medium returns through the expansion valve supply conduit 534 and is directed through the expansion valve 530 by the indoor heating check valve 592. The modified heat-transfer medium exits through a second expansion valve return conduit 533.

The modified heat-transfer medium continues to an outdoor heat exchanger 541 through a second expansion valve to heat exchanger conduit 535. Airflow is driven across the outdoor heat exchanger 541 by an outdoor fan 543. In the illustrated configuration, the outdoor heat exchanger 541 provides the function of an evaporator, vaporizing the modified heat-transfer medium by cooling the warm air. The resulting heat-transfer medium vapor returns to the compressor 550 through the outdoor heat exchanger to factory reversing valve conduit 584 and compressor supply conduit 582 to complete the thermodynamic cycle.

The thermal cycle is reversed by alternating the state of each of the reversing valves 560, 561. The factory reversing valve 560 governs the source and direction of flow of the heat-transfer medium to the compressor 550. In the illustrated embodiment, the factory reversing valve 560 sources the heat-transfer medium from the outdoor heat exchanger 541. In the alternate or reverse configuration, the factory reversing valve 560 sources the heat-transfer medium from the indoor heat exchanger 540. The solar reversing valve 561 governs the direction of flow of the heat-transfer medium from the solar heater assembly 510. The solar reversing valve 561 provides an optional bypass, where the solar reversing valve 561 can be configured to route the heat-transfer medium to the solar heater assembly 510 or bypass the solar heater assembly 510, routing the heat-transfer medium directly to the factory reversing valve 560.

A reversible-cycle heat pump system 600 enhances the reversible-cycle heat pump system 500 with the inclusion of a second solar heater assembly 612, as illustrated in FIG. 8. The primary components between the reversible-cycle heat pump system 600 and the reversible-cycle heat pump system 500 are the same, with the additional components being integrated to support the pair of solar heater assemblies 610, 612. Like features of reversible-cycle heat pump system 600 and reversible-cycle heat pump system 500 are numbered the same except preceded by the numeral '6'. Similar to the reversible-cycle heat pump system 500, the reversible-cycle heat pump system 600 includes the solar heater thermal enhancement manifold assembly 200 integrated within the solar heater assemblies 610, 612.

The heat-transfer medium is supplied to the pair of solar heater assemblies 610, 612 by a compressor to solar heater supply conduit 652 and a series of control valves 670, 672, 674, 676. Each control valve 670, 672, 674, 676 governs flow of the heat-transfer medium into the respective solar heater assembly 610, 612 via a solar heater fluid delivery conduit 656, 657, 658, 659 respectively. The operation of the series of control valves 670, 672, 674, 676 can be used to provide redundancy as well as to optimize the heating process. The solar heater assemblies 610, 612 transfer thermal energy to the heat-transfer medium. The thermally charged heat-transfer medium is returned through a first solar heater fluid return conduit 616 and a second solar heater fluid return conduit 617 and collected by a thermally elevated fluid conduit 614. The thermally elevated fluid conduit 614 transports the thermally charged heat-transfer medium to the reversing valves 660, 661 and is directed based upon the configurations thereof.

The balance of the reversible-cycle heat pump system 600 functions as previously described respective to the reversible-cycle heat pump system 500.

The Freon gas moves through the solar collector at a much faster rate than if the collector was used for heating water. This means the heat contained within the collector is rapidly dissipated into the Freon gas flowing through the tubes. In order to maintain an average heat gain of fifteen (15) degrees Fahrenheit, the panels must be alternated and given a chance to recharge. The series of solar heater fluid supply control valves 670, 672, 674, 676 enable the system to alternate between solar heater assemblies 610, 612 to increase the overall efficiency thereof.

An exemplary alternating control sequence can be as follows:

In the illustrated configuration, the compressor 650 sends gas through the factory reversing valve 660. If an integrated photo sensor indicates sufficient light, the Dual Panel Solar Assist (DPSA) valve opens and the gas is routed through the first panel 610 and back into the unit. In an application where the system 600 may or may not include a solar heater thermal enhancement manifold assembly 200, the concept can be implemented by applying the control sequence to a pair to first solar heater assembly 610, 612, wherein an exemplary sequence is as follows:
 a. After ten (10) minutes, the first panel doses and the second panel opens,
 b. After ten (10) minutes, the second panel closes and the first panel opens,
 c. After ten (10) minutes the first panel closes and the second panel opens,
 d. After ten (10) minutes, the second panel closes and the first panel opens,
 e. After ten (10) minutes, both panels open, or
 f. After ten (10) minutes, both panels close for ten (10) minutes and the cycle begins again.

A reversible-cycle heat pump system 700 integrates a hot water heat exchanger 820 into the reversible-cycle heat pump system 700 as illustrated in FIG. 9. The primary components between the reversible-cycle heat pump system 700 and the reversible-cycle heat pump system 600 are the same, with the additional components being integrated to support the hot water heat exchanger 820. Like features of reversible-cycle heat pump system 700 and reversible-cycle heat pump system 600 are numbered the same except preceded by the numeral '7'. The reversible-cycle heat pump system 700 includes a series of conduits and valves to support thermal transfer at the hot water heat exchanger 820. The thermally charged heat-transfer medium is supplied to the hot water heat exchanger 820 via a solar heater to hot water heat exchanger conduit 840 and returns via an initial hot water heat exchanger return conduit 826. The initial hot water heat exchanger return conduit 826 transfers the thermally spent heat-transfer medium to a transition junction between a hot water heat exchanger to expansion valve conduit 822 and an indoor unit shut off valve hot water heat exchanger to factory reversing valve conduit 832. Flow of the heat-transfer medium is governed by a pair of valves 824, 830. The thermally charged heat-transfer medium can be supplied to the outdoor heat exchanger 740 directly from the solar heater assemblies 710, 712 through the hot water bypass valve 850 (continuing through a hot water heater bypass conduit 844) and/or indirectly from the hot water heat exchanger 820 through the indoor unit shut off valve 830. Alternatively, the thermally spent heat-transfer medium can be routed directly to the second expansion valve 731, passing through the outdoor unit return valve 824 and conveyed by the hot water heat exchanger to expansion valve conduit 822. This configuration enables the system to prioritize the operation to generate heat water when the temperature drops below a certain point. This will not only provide free hot water, but also improves the air conditioning performance as the hot water heat exchanger 820 acts as an additional condenser. This will be especially effective as, when in the air conditioning cycle; gas is not routed through the first solar heater assembly 710 unless used for water heating or pool heating. This allows the solar heater assemblies 710, 712 to have the maximum heat available to put very hot gas into the hot water heat exchanger 820, which rapidly heats the water.

Flow of the heat-transfer medium through the solar heater assemblies 710, 712 can be circumvented by the solar reversing valve 761 and/or the collector shut off valve 842. Flow through the hot water heat exchanger 820 can be governed by the indoor unit shut off valve 830.

It is understood that the solar heater assemblies 410, 412 can be retrofitted to any new or existing heat pump system. For residential applications, the solar collectors are small enough, approx 30" wide×5' long to be mounted on the side of a building, similar to a satellite dish.

It is understood that domestic hot water can be integrated into any existing heat pump system described herein. The following relates to integrating a domestic hot water system into the existing heat pump, wherein the control sequence operates the heat pump in a heating cycle.
 a. Domestic hot water can be added to any existing or new heat pump, either a new system complete with tank or an existing system can have a heat exchanger, circulation pump and controls added.
 b. The collector control sequence is the same as for the house heat pump without hot water
 c. When the house heating system cycles off, which normally occurs three (3) times per hour, the heat pump will continue to run, the inside unit will cycle off, the inside unit shutoff valve will close and the outdoor unit return valve will open. A relay will start the circulation pump to run the water through the hot water heat exchanger.
 d. The hot gas from the solar collectors will go through the domestic hot water heat exchanger to heat the water and instead of going into the inside unit will return to the expansion valve on the outside unit.
 e. If the hot water is heated to the desired temperature before the house heat calls to be activated, the inside unit shutoff valve will open and the outdoor unit return valve will close. The entire system will cycle off, ready to start in house heat mode again.
 f. If the house heating system calls for heat before the hot water has been heated to the desired set temperature, the inside unit shutoff valve will open, the outdoor unit return valve will close and the inside unit will restart providing house heat.
 g. If during periods of extended sub freezing temperatures, the hot water temperature cannot be maintained by the heat pump during the off cycle periods, the hot water will be supplemented by an electric means in the water heating system.
 h. When there is insufficient light, as determined by the control system, the solar collectors will be bypassed (SCRV will remain closed), the hot water bypass valve will open, and the collector shutoff valve will close. The house heating and domestic water heating will operate on the same control and priority system as they do with the collector operation.

It is understood that domestic hot water can be integrated into any existing heat pump system described herein. The following relates to integrating a domestic hot water system into the existing heat pump, wherein the control sequence operates the heat pump in a cooling cycle.

a. Domestic hot water can be added to any existing or new heat pump, either a new system complete with tank or an existing system can have a heat exchanger, circulation pump and controls added.

b. The collector control sequence is the same as for the house heat pump without hot water, except that in addition to the photoelectric sensor, the Solar Collector Reversing Valve (SCRV) does not open until the hot water system calls for heat and the circulation pump starts.

c. When the heat pump is in the cooling cycle, the hot water bypass valve is closed and the heat exchanger valves are open.

d. The hot gas from the solar collectors will go through the domestic hot water heat exchanger to heat the water and continue on through the normal cooling cycle, which is through the outside condenser.

e. If the hot water is heated to the desired temperature while the cooling system is still running, the circulation pump will stop, the heat exchanger valves will close and the hot water bypass will open.

f. In the unlikely event, during cooling season, that the cooling system cannot maintain the desired water temperature, the hot water system will be supplemented by an electric means in the water heating system.

g. When there is insufficient light, as determined by the control system, the solar collectors will be bypassed. The house cooling and domestic water heating will operate on the same control and priority system as they do with the collector operation.

It is understood that domestic hot water can be integrated into any existing pool heat pump system, such as the solar assisted heat pump system 400 presented in FIG. 6. The integration provides several benefits:

a. Pool heating will run according to factory settings. The solar collectors have no effect on the pool heating operation other than heating the water quicker.

b. The hot gas will run through the solar heater assemblies' 410, 412 and hot water heat exchanger 420 using the same timing sequence for the collectors as for the residential or structural heat pump. When the desired pool temperature is reached, the pool heat pump will cycle off.

c. The hot gas from the solar heater assemblies 410, 412 goes through the domestic hot water heat exchanger first and then through the pool heat exchanger 420. When domestic hot water needs to be heated, a relay will start the circulation pump to run the water through the hot water heat exchanger 420. When the water has heated to the desired set point, a relay will shut off the circulation pump.

d. When the pool heater is not running, and the hot water system calls for heat, the heat pump will start and the hot gas will run through the solar heater assemblies 410, 412 and heat exchangers. The circulation pump (not shown) for the domestic hot water will also start and will run until the hot water system reaches its desired temperature, at which point the circulation pump and pool heat pump (not shown) will shut off.

e. When there is insufficient light, as determined by a control system, the solar heater assemblies 410, 412 will be bypassed by operating the bypass valve 454. The domestic water heating or pool heating will operate on the same control and priority system as they do with the collector operation.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A solar collector assembly configured for integration with a heat pump system for improving the efficacy of the heat pump system, the solar collector assembly comprising:

a compressor;

a heat exchanger;

a plurality of enclosed solar heater collection tubes;

a fluid distribution manifold subassembly, comprising:
 a fluid supply inlet;
 a first fluid supply distribution conduit;
 a second fluid supply distribution conduit;
 a fluid supply control valve fluidly interconnecting said fluid supply inlet with said first and second fluid supply distribution conduits to control the flow of said fluid from said fluid supply inlet to said first and second fluid supply distribution conduits; and
 a volume of refrigerant entrapped within the fluid distribution manifold subassembly;

a fluid collection manifold subassembly, comprising:
 a fluid return outlet;
 a first fluid return collection conduit;
 a second fluid return collection conduit; and
 a fluid return control valve fluidly interconnecting said fluid return outlet with said first and second fluid return collection conduits to control the flow of said fluid from said first and second fluid return collection conduits to said fluid return outlet;

a heat exchanger to compressor conduit providing a fluid communication passageway between the heat exchanger and the compressor;

a compressor to solar heater supply conduit providing a fluid communication passageway between the compressor and the fluid supply inlet;

a thermally elevated fluid conduit providing a fluid communication passageway between the fluid return outlet and the heat exchanger;

at least one first thermal transfer enhancing tube having a fluid inlet end for receiving a flow of fluid from said first fluid supply distribution conduit and a fluid outlet end for the egress of said flow of fluid from said first fluid supply distribution conduit into said first fluid return collection conduit; and at least one second thermal transfer enhancing tube having a fluid inlet end for receiving a flow of fluid from said second fluid supply distribution conduit and a fluid outlet end for the egress of said flow of fluid from said second fluid supply distribution conduit into said second fluid return collection conduit, wherein, one of the at least one first thermal transfer enhancing tubes and one of the at least one second thermal transfer enhancing tube are located together within the same enclosed collection tube of the plurality of solar heater collection tubes;

wherein, fluid flow through said solar collector assembly is controlled to alternate fluid flow through said first and second thermal transfer enhancing tubes such that stagnant fluid in said first thermal transfer enhancing tube is subjected to solar heating while fluid continues to flow through said second thermal transfer enhancing tube, and vice versa.

2. A solar collector assembly as recited in claim 1, wherein an interior of the solar heater collection tubes housing the first thermal transfer enhancing tube and the second thermal transfer enhancing tube are evacuated.

3. A solar collector assembly as recited in claim 1, wherein the thermal transfer enhancing tubes are fabricated of copper.

4. A solar collector assembly as recited in claim 1, wherein the thermal transfer enhancing tubes are fabricated in a "U" shape.

5. A solar collector assembly as recited in claim 1, further comprising a fan, wherein the fan creates a thermal transfer from the heat exchanger to a surround environment.

6. A solar collector assembly as recited in claim 1, further comprising a second fluid flow path, wherein thermal energy is transferred from the heat exchanger to fluid passing through the second fluid flow path.

7. A solar collector assembly configured for integration with a heat pump system for improving the efficacy of the heat pump system, the solar collector assembly comprising:
- a compressor;
- a heat exchanger;
- a plurality of enclosed solar heater collection tubes;
- a fluid distribution manifold subassembly, comprising:
  - a fluid supply inlet;
  - a first fluid supply distribution conduit;
  - a second fluid supply distribution conduit;
  - a fluid supply control valve fluidly interconnecting said fluid supply inlet with said first and second fluid supply distribution conduits to control the flow of said fluid from said fluid supply inlet to said first and second fluid supply distribution conduits; and
- a volume of refrigerant entrapped within the fluid distribution manifold subassembly;
- a fluid collection manifold subassembly, comprising:
  - a fluid return outlet;
  - a first fluid return collection conduit;
  - a second fluid return collection conduit; and
  - a fluid return control valve fluidly interconnecting said fluid return outlet with said first and second fluid return collection conduits to control the flow of said fluid from said first and second fluid return collection conduits to said fluid return outlet;
- a heat exchanger to compressor conduit providing a fluid communication passageway between the heat exchanger and the compressor;
- a compressor to solar heater supply conduit providing a fluid communication passageway between the compressor and the fluid supply inlet;
- a thermally elevated fluid conduit providing a fluid communication passageway between the fluid return outlet and the heat exchanger; and,
- at least one first thermal transfer enhancing tube having a fluid inlet end for receiving a flow of fluid from said first fluid supply distribution conduit and a fluid outlet end for the egress of said flow of fluid from said first fluid supply distribution conduit into said first fluid return collection conduit;
- at least one second thermal transfer enhancing tube having a fluid inlet end for receiving a flow of fluid from said second fluid supply distribution conduit and a fluid outlet end for the egress of said flow of fluid from said second fluid supply distribution conduit into said second fluid return collection conduit; and
- a manifold control unit, wherein the manifold control unit is in signal communication with each of the fluid supply control valve and the fluid return control valve, wherein, one of the at least one first thermal transfer enhancing tubes and one of the at least one second thermal transfer enhancing tube are located together within the same enclosed collection tube of the plurality of solar heater collection tubes;
- wherein, fluid flow through said solar collector assembly is controlled by the manifold control unit to alternate fluid flow through said first and second thermal transfer enhancing tubes such that stagnant fluid in said first thermal transfer enhancing tube is subjected to solar heating while fluid continues to flow through said second thermal transfer enhancing tube, and vice versa.

8. A solar collector assembly as recited in claim 7, wherein an interior of the solar heater collection tubes housing the first thermal transfer enhancing tube and the second thermal transfer enhancing tube are evacuated.

9. A solar collector assembly as recited in claim 7, wherein the thermal transfer enhancing tubes are fabricated of copper.

10. A solar collector assembly as recited in claim 7, wherein the thermal transfer enhancing tubes are fabricated in a "U" shape.

11. A solar collector assembly as recited in claim 7, further comprising a fan, wherein the fan creates a thermal transfer from the heat exchanger to a surround environment.

12. A solar collector assembly as recited in claim 7, further comprising a second fluid flow path, wherein thermal energy is transferred from the heat exchanger to fluid passing through the second fluid flow path.

13. A heat pump system, the heat pump system comprising:
- a compressor;
- a first heat exchanger;
- a second heat exchanger;
- a reversing valve;
- a solar collector assembly comprising a plurality of solar heater collection tubes;
- a fluid distribution manifold subassembly, comprising:
  - a fluid supply inlet;
  - a first fluid supply distribution conduit;
  - a second fluid supply distribution conduit; and
  - a fluid supply control valve fluidly interconnecting said fluid supply inlet with said first and second fluid supply distribution conduits to control the flow of said fluid from said fluid supply inlet to said first and second fluid supply distribution conduits;
- a fluid collection manifold subassembly, comprising:
  - a fluid return outlet;
  - a first fluid return collection conduit;
  - a second fluid return collection conduit; and
  - a fluid return control valve fluidly interconnecting said fluid return outlet with said first and second fluid return collection conduits to control the flow of said fluid from said first and second fluid return collection conduits to said fluid return outlet; and,
- at least one first thermal transfer enhancing tube having a fluid inlet end for receiving a flow of fluid from said first fluid supply distribution conduit and a fluid outlet end for the egress of said flow of fluid from said first fluid supply distribution conduit into said first fluid return collection conduit;
- at least one second thermal transfer enhancing tube having a fluid inlet end for receiving a flow of fluid from said second fluid supply distribution conduit and a fluid outlet end for the egress of said flow of fluid from said second fluid supply distribution conduit into said second fluid return collection conduit;

a manifold control unit, wherein the manifold control unit is in signal communication with each of the fluid supply control valve and the fluid return control valve;

a heat exchanger to compressor conduit providing a fluid communication passageway between the second heat exchanger and the compressor;

a thermally elevated fluid conduit providing a fluid communication passageway between the fluid return outlet and the reversing valve;

a reversing valve to compressor conduit providing a fluid communication passageway between the reversing valve and the compressor;

a compressor to solar heater supply conduit providing a fluid communication passageway between the compressor and the fluid supply inlet;

a reversing valve to first heat exchanger conduit providing a fluid communication passageway between the reversing valve and the first heat exchanger;

a first heat exchanger to second heat exchanger conduit;

a second heat exchanger to reversing valve conduit providing a fluid communication passageway between the second heat exchanger and the reversing valve;

wherein, one of the at least one first thermal transfer enhancing tubes and one of the at least one second thermal transfer enhancing tube is located within one of the plurality of solar heater collection tubes;

wherein, fluid flow through said solar collector assembly is controlled by the manifold control unit to alternate fluid flow through said first and second thermal transfer enhancing tubes such that stagnant fluid in said first thermal transfer enhancing tube is subjected to solar heating while fluid continues to flow through said second thermal transfer enhancing tube, and vice versa, wherein, the reversing valve controls a direction of fluid flow within a flow path created by a collection of the conduits.

14. A solar collector assembly as recited in claim 13, wherein the solar heater collection tubes are evacuated.

15. A solar collector assembly as recited in claim 13, wherein the thermal transfer enhancing tubes are fabricated of copper.

16. A solar collector assembly as recited in claim 13, further comprising a volume of refrigerant entrapped within the fluid distribution manifold subassembly.

* * * * *